June 14, 1927. J. NĚMEC 1,632,144
THERMOSTATIC APPARATUS
Filed Aug. 17, 1925

INVENTOR
Joseph Němec
BY
Cushman, Dryant Darby
ATTORNEYS

Patented June 14, 1927.

1,632,144

UNITED STATES PATENT OFFICE.

JOSEF NĚMEC, OF MSTISOV, CZECHOSLOVAKIA.

THERMOSTATIC APPARATUS.

Application filed August 17, 1925, Serial No. 50,746, and in Czechoslovakia April 21, 1925.

This invention relates to apparatus of that type which is operated by the expansion of metal due to abnormal heat occasioned, for instance, by fire, and which is used for automatically opening valves to permit of the escape of water, or to close valves to cut off gas.

An object of this invention is to provide a simple device, of the character above referred to which, being in its entirety, a small complete article, which can be readily interposed in a fuel pipe, for instance, renders it particularly well adapted for use on mechanically propelled vehicles and aircraft for cutting off the flow of fuel in the event of a conflagration. A further object is to provide a device of the type referred to, of which the movement, produced by expansion of metal, can be used for any required purposes in addition to those above mentioned, as for instance, ringing electric fire alarm bells, or setting fire-extinguishing devices in operation. A further object is to combine integrally with a device, constructed as hereinafter described, a cock which, under normal conditions can be manipulated to turn on or off a supply of fluid at will; but which, when the improved device has been operated, by excessive heat in the vicinity in which it is situated, cannot be manipulatively operated to turn on the flow of fluid until the surrounding temperature has decreased, thereby constituting a safeguard against fire.

Figure 1:
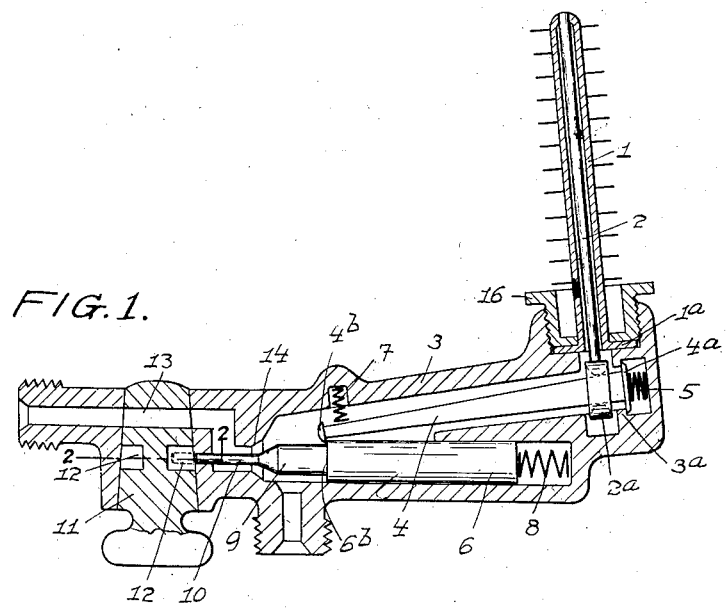
Figure 1 is a more or less diagrammatic sectional, view of an apparatus for extinguishing a fire by cutting off the fuel supply.
Figure 2:
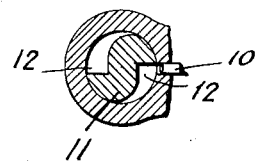
Figure 2 is a detail section, substantially on the line 2—2 of Figure 1.

According to the invention, the device comprises a thin walled, preferably ribbed tube 1 of aluminium, zinc, brass or other material possessing a higher co-efficient of expansion than the rod 2 inserted into the said tube and fixed to the free end thereof at its outer extremity. The tube 1 is secured to the casing 3 by means of a screw plug 16 which clamps the flange 1ª thereof.

At its lower end the rod 2 carries a ring or eye 2ª which embraces a lever 4 resting with its head 4ª at one end, under the pressure of a spring 5, against a shoulder 3ª formed in a bore of the casing. A second bore arranged at an acute angle to the first mentioned bore is adapted to guide an axially movable plunger 6, provided at one end with a reduced portion forming a shoulder 6ᵇ and normally held in position to resist the outward thrust of the spring 8 by the knob or head 4ᵇ of lever 4 which engages the shoulder 6ᵇ under the influence of a spring 7.

In consequence of the high rise of temperature concurrent with the commencement of a fire the tube 1 expands to a greater extent than the inner rod 2, so that the lever 4 is rocked to release the shoulder 6ᵇ of the plunger 6 which, under the influence of spring 8 is forced towards the left. This displacement of the plunger 6 is utilized to actuate a device whereby extinction of the fire may be effected.

With this object in view the plunger 6 as shown is provided with a valve 9 which terminates in a needle 10, normally extending to the circumferential surface of the plug 11 of the fuel control cock. In an axial plane of the needle 10 at right angles to the axis of the cock plug 11, the plug 11 has formed in it, two diametrically opposite recesses 12 axially parallel to the axis of the passage-way 13. When therefore the cock 11 is open one of the said recesses 12 faces the needle 10. When upon the beginning of a fire the lever 4 releases the shoulder 6ᵇ of the plunger 6 the valve 9, being displaced with the plunger 6, arrests the supply of fuel by resting on its seating 14, whereby simultaneously the needle 10 enters the recess 12. So long as the tube 1 has not been retracted by cooling to its original length, the fuel supply cannot be opened. By turning the cock 11 about 90°, the valve 9 will be forced back from its seating and the passage-way 13 be simultaneously closed. Should the cock 11 be turned 180°, in which position the passage-way 13 is again open, the needle enters the recess 12 which for the time being faces it and the valve 9 is again forced onto its seating 14 by the spring 8. Only when cooling has caused the tube 1 to retract to such an extent that the lever 4 is again enabled to engage the shoulder 6ᵇ of the plunger 6, will it be possible, by turning the cock 11 about 90°, and shifting the plunger 6 into such a position in which the knob 4ᵇ is enabled to snap into engagement therewith to maintain the valve 9 in the open position.

What I claim and desire to secure by Letters Patent of the United States is:—

1. In a device of the type described, a casing having a horizontally disposed bore therein, a plunger slidable in said bore and having a reduced portion forming an annular shoulder, said reduced portion being provided with a tapered portion having a stem projecting therefrom, a spring within the bore tending to move the plunger in one direction, a lever within the casing having one of its ends rockingly retained therein and its free end formed with a head, a spring for normally retaining said head engaged with the aforesaid shoulder on the plunger when it has been caused to recede within the bore which contains it and in opposition to the force of the first-mentioned spring, a rod having, at one end, an eye which encompasses the rockingly mounted lever, and a tube of easily expanding metal encompassing said rod and secured at one end, to the free end of the aforesaid rod and, at its other end, to the casing.

2. In a device of the type described, a casing having a fluid passage formed therein comprising a horizontally disposed bore and a valve seat in alignment with said bore and intermediate of the length of the fluid passage, a plunger slidable in the aforesaid bore and having a reduced portion forming an annular shoulder said reduced portion provided with a tapered portion constituting a valve and a stem normally projecting through the valve-seat, a spring within the aforesaid bore tending to move the plunger in one direction, a lever within the casing having one of its ends rockingly retained therein and its free end formed with a head, a spring for normally retaining said head engaged with the aforesaid shoulder on the plunger when it has been caused to recede within the bore which contains it, and in opposition to the force of the first-mentioned spring, a rod having, at one end, an eye which encompasses the rockingly mounted lever, a tube of easily expanding metal encompassing said rod and secured, at one end, to the free end of the aforesaid rod and, at its other end to the casing, and a manipulative plug revolubly fitted transversely of the aforesaid fluid passage and having a transversely disposed bore in alignment with said passage and diametrically opposed notches in alignment with the aforesaid stem which projects from the valve.

JOSEF NĚMEC.